United States Patent
Hoots et al.

(10) Patent No.: US 6,966,213 B2
(45) Date of Patent: Nov. 22, 2005

(54) RAPID METHOD FOR DETECTING LEAKS OF HYDRAULIC FLUIDS IN PRODUCTION PLANTS

(75) Inventors: John E. Hoots, St. Charles, IL (US); Craig W. Myers, Lisle, IL (US); Chris A. Nickoloff, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/767,166

(22) Filed: Jan. 28, 2004

(65) Prior Publication Data
US 2005/0160795 A1    Jul. 28, 2005

(51) Int. Cl.$^7$ .............................................. G01M 3/04
(52) U.S. Cl. ...................................................... 73/40.7
(58) Field of Search ......................................... 73/40.7

(56) References Cited

U.S. PATENT DOCUMENTS
2005/0019934 A1 *   1/2005   Duerr ........................... 436/56

FOREIGN PATENT DOCUMENTS
WO         WO 025240       *   3/2004

* cited by examiner

Primary Examiner—Daniel S. Larkin
(74) Attorney, Agent, or Firm—Michael B. Martin; Thomas M. Breininger

(57) ABSTRACT

A method of detecting and compensating for leakage of hydraulic fluids in a production plant, is described and claimed. The method requires two tracer materials, each with its own separate and uniquely detectable fluorescent signal. One of the tracer materials is used for rapid detection of leakage of hydraulic fluid into the cooling water and the other tracer material is used to determine the buildup of hydraulic fluid within the cooling water system.

18 Claims, No Drawings

RAPID METHOD FOR DETECTING LEAKS OF HYDRAULIC FLUIDS IN PRODUCTION PLANTS

FIELD OF INVENTION

This invention is in the field of production plants. Specifically, this invention is in the field of the use of fluorescent tracers in the hydraulic fluids used in equipment found in production plants, where the fluorescent tracers are used to detect and compensate for leaks of hydraulic fluid into the cooling water system of the production plant.

BACKGROUND OF THE INVENTION

Hydraulic fluids are defined as a liquid or mixture of liquids designed to transfer pressure from one point to another in a system on the basis of Pascal's Law.

Hydraulic fluids are used in many different types of production plants to operate the many different types of heavy equipment that shapes the product being produced into its desired form. Hydraulic fluid may leak from said hydraulic equipment onto surrounding equipment, building structures, and, in certain production processes, into the cooling water used to cool the product that is being produced. In all production plants, including production plants where the casting and milling of aluminum, steel, nickel, copper, brass or zinc takes place, it is desirable to minimize the amount of hydraulic fluid that leaks into the process cooling water system. Minimizing hydraulic fluid leaks into process cooling water in these systems offers a variety of potential benefits, including a reduced risk of microbiological growth outbreak caused by micro-organisms being able to feed and grow by digesting the hydraulic fluid, reduced variability of the process cooling water chemistry, reduced use of oxidizing biocides and reduced risk of process failures.

The costs associated with correction of hydraulic fluid leaks are due to added cost of replacing the hydraulic fluid which has leaked, system performance problems in the cooling water system where the hydraulic fluid has leaked, and metal casting problems due to reduced quality of cooling water such as plugging of spray nozzles, increased use of biocides, breakouts of hot metal during casting, and system shutdowns.

A current method of leak detection for hydraulic fluids is visual identification of a brightly colored hydraulic fluid showing up in contrast to its surroundings for leaks that occur onto surrounding equipment or building structures. The use of calorimetric detection, to detect a leak of hydraulic fluid into the cooling water system based on the visually detectable color of the dyes used, is known in the art to be insensitive and prone to interferences.

References that describe other techniques for leak detection of different types of fluids are as follows:

U.S. Pat. No. 5,304,800, entitled, Leak Detection and Responsive Treatment in Industrial Water Processes, describes and claims a process for detecting leakage from a process fluid to a temperature-conditioning fluid in an industrial process.

U.S. Pat. No. 5,320,967, entitled Boiler System Leak Detection, describes and claims a method of determining leakage from a boiler water system.

U.S. Pat. No. 5,416,323, entitled Leak Detection and Responsive Treatment in Industrial Water Processes, describes and claims a process for detecting leakage between a process fluid and a temperature-conditioning fluid in an industrial process wherein said industrial process includes an A and a B fluid, wherein one of said A and B fluids receives heat from or transfers heat to the other of said A and said B fluids by an indirect contact method, wherein one but not both of said A and said B fluids is an industrial process fluid, and wherein at least one of said A and said B fluids is a gaseous stream.

U.S. Pat. No. 5,658,798, entitled Detection of Process Components In Food Process Stream by Fluorescence, describes and claims a method for the monitoring of the variation in amount of fluorescing impurities during food processing in food process streams which contain fluorescing impurities.

U.S. Pat. No. 5,379,916, entitled Apparatus and Method for Determining the Concentration of Species in a Substance, describes and claims an instrument for determining the concentration of at least one species in a substance. The instrument and method can be used to identify and distinguish among various degrees of contamination of motor oil, diesel fuel, and hydraulic fluid by water, ethylene glycol, wear particles, and loss of anti-oxidants. The instrument includes a broad band light source, such as a tungsten filament incandescent lamp, which is very inexpensive and reliable. A fiber optic link is provided to a detector that receives and discriminates among optical spectral transmissions through the fiber optic. Discrimination circuitry is provided for evaluating the transmission and providing a readout that indicates the quality of the fluid. The instrument is suitable for in situ determination of oil quality.

U.S. Pat. No. 5,919,707, entitled Monitoring of Rolling Oil Emulsions, describes and claims a method for determining the concentration of an active ingredient contained in a rolling oil emulsion having two or more distinct phases at least one of said phases being liquid.

U.S. Pat. No. 6,165,384, entitled Full Spectrum Fluorescent Dye Composition for the Optimization of Leak Detection Process, describes and claims a fluorescent dye composition for inclusion in a working fluid for detecting sites of fluid leakage, the composition comprising a mixture of a perylene dye, a naphthalimide dye, and a hydrocarbon-based fluid, wherein the combination of the perylene dye, the naphthalimide dye and the hydrocarbon-based fluid are miscible in the working fluid, the working fluid being selected from the group consisting of heavy lubricants and transmission fluids and volumetric ratio of the perylene dye to the naphthalimide dye in the composition is in the range of from about 1.5:1 to about 5:1.

It is desirable to have an additional method for detecting and compensating for leakage of hydraulic fluids in a production plant.

SUMMARY OF THE INVENTION

The first aspect of the instant claimed invention is a method of detecting and compensating for leakage of hydraulic fluids in a production plant, comprising the steps of:

1) providing a production plant wherein at least one hydraulic fluid is in use to operate equipment, wherein the equipment operated shapes the product being produced into a desired form, wherein said product being produced is contacted, in at least one point in the production process, with water, wherein the water that contacts the product is then collected and circulated through the production plant cooling water system;

2) adding to said hydraulic fluid, two tracer materials,
   (a) wherein the first tracer material, known as Tracer First, is capable of being detected at a level of at least about 50 ppt and is capable of having its fluorescent signal degraded by contact with materials present in the cooling water, and wherein the second tracer material, known as Tracer Second, is capable of being detected at a level of at least about 1 ppb, and is not capable of having its fluorescent signal degraded by contact with materials present in the cooling water,
   (b) wherein each of Tracer First and Tracer Second is added to said hydraulic fluid in a known proportion to said hydraulic fluid and to each other, and
   (c) wherein the fluorescent signals of each of Tracer First and Tracer Second are individually detectable in said hydraulic fluid, and the fluorescent signals of each of Tracer First and Tracer Second are individually detectable in said water that is collected and circulated through the production plant cooling water system;
3) providing one or more fluorometers capable of detecting the fluorescent signal of Tracer First and locating said one or more fluorometers in any location within the cooling water system of said production plant, where it is desired to detect and compensate for leakage of hydraulic fluid;
4) providing one or more fluorometers capable of detecting the fluorescent signal of Tracer Second and locating said one or more fluorometers in any location within the cooling water system of said production plant where it is desired to detect and compensate for leakage of hydraulic fluid;
5) using a fluorometer to detect and measure the fluorescent signal of said Tracer First in each location chosen;
6) using a fluorometer to detect and measure the fluorescent signal of said Tracer Second in each location chosen;
7) using the detected and measured fluorescent signals of Tracer First and of Tracer Second to determine how much of the hydraulic fluid is present in the cooling water system of said production plant; and optionally;
8) adjusting the operating parameters of said production plant, such that the amount of hydraulic fluid present in said cooling water system is minimized or compensated for such that operation of the production plant is maintained at the best possible level.

DETAILED DESCRIPTION OF THE INVENTION

Throughout this patent application the following terms have the indicated definitions:

"aka" stands for also known as.

"CAS Registry No." refers to the Chemical Abstracts Services Registry Number.

"capable of being detected" means a fluorescent signal that is at least about five times larger than the fluorescent signals of the background materials present.

"Citgo" refers to Citgo Petroleum Corp., 1 Warren Place, 6100 S. Yale Ave. Tulsa, Okla.

"ExxonMobil" refers to ExxonMobil Corp., 3225 Gallows Rd., Fairfax, Va. 22037, telephone number (703) 846-3000.

"gpm" means gallons per minute.

"Nalco" refers to Nalco Company, 1601 W. Diehl Road, Naperville Ill. 60563, telephone number (630) 305-1000.

"ppb" means parts per billion.

"ppm" means parts per million.

"ppt" means parts per trillion.

"shapes" refers to casting, rolling, molding or otherwise transforming an object from one physical appearance or physical dimension to another physical appearance or physical dimension;

The first aspect of the instant claimed invention is a method of detecting and compensating for leakage of hydraulic fluids in a production plant, comprising the steps of:

1) providing a production plant wherein at least one hydraulic fluid is in use to operate equipment, wherein the equipment operated shapes the product being produced into a desired form, wherein said product being produced is contacted, in at least one point in the production process, with water, wherein the water that contacts the product is then collected and circulated through the production plant cooling water system;
2) adding to said hydraulic fluid, two tracer materials,
   (a) wherein the first tracer material, known as Tracer First, is capable of being detected at a level of at least about 50 ppt and is capable of having its fluorescent signal degraded by contact with materials present in the cooling water, and wherein the second tracer material, known as Tracer Second, is capable of being detected at a level of at least about 1 ppb, and is not capable of having its fluorescent signal degraded by contact with materials present in the cooling water,
   (b) wherein each of Tracer First and Tracer Second is added to said hydraulic fluid in a known proportion to said hydraulic fluid and to each other, and
   (c) wherein the fluorescent signals of each of Tracer First and Tracer Second are individually detectable in said hydraulic fluid, and the fluorescent signals of each of Tracer First and Tracer Second are individually detectable in said water that is collected and circulated through the production plant cooling water system;
3) providing one or more fluorometers capable of detecting the fluorescent signal of Tracer First and locating said one or more fluorometers in any location within the cooling water system of said production plant, where it is desired to detect and compensate for leakage of hydraulic fluid;
4) providing one or more fluorometers capable of detecting the fluorescent signal of Tracer Second and locating said one or more fluorometers in any location within the cooling water system of said production plant where it is desired to detect and compensate for leakage of hydraulic fluid;
5) using a fluorometer to detect and measure the fluorescent signal of said Tracer First in each location chosen;
6) using a fluorometer to detect and measure the fluorescent signal of said Tracer Second in each location chosen;
7) using the detected and measured fluorescent signals of Tracer First and of Tracer Second to determine how much of the hydraulic fluid is present in the cooling water system of said production plant; and optionally;
8) adjusting the operating parameters of said production plant, such that the amount of hydraulic fluid present in said cooling water system is minimized or compensated for such that operation of the production plant is maintained at the best possible level.

The method of the instant claimed invention can be used in any production plant where at least one hydraulic fluid is in use to operate equipment, where the equipment operated shapes the product being produced into a desired form, wherein the product being produced is contacted, in at least one point in the production process, with water, where the water that contacts the product is then collected and circulated through the production plant cooling water system. Production plants where this is the modus of operation include steel mills, aluminum mills, rolling mills, certain plastic manufacturing facilities, and plants where copper, zinc, nickel and alloys thereof are processed. Preferred production plants include aluminum mills and steel mills.

Hydraulic fluids that are suitable for use in the method of the first aspect of the instant claimed invention are selected from the group consisting of water based and non-water based. Within the category of water based hydraulic fluids the fluids are divided into the categories of: a) water/glycol hydraulic fluids typically used for high-pressure applications (less than 3000 psig;
b) water-in-oil emulsion ("invert emulsion") hydraulic fluids typically used for medium-pressure applications (below 800 psig); and
c) oil-in-water emulsion (95% water or "5/95") hydraulic fluids typically used for low-pressure pressure applications (below 300 psig).

Water based hydraulic fluids suitable for use in the instant claimed invention include the following: Mobil Nyvac FR200D High Performance Fire-resistant Hydraulic Fluid, available from ExxonMobil; Firexx HF-C Hydraulic Fluid, available from ExxonMobil; Citgo Glycol FR-40XD available from Citgo; Mobil Pyrogaurd D, available from ExxonMobil; Firexx HF-A, available from ExxonMobil.

Non-water based hydraulic fluids generally refer to phosphate ester based hydraulic fluids and polyol ester hydraulic fluids. Suitable phosphate ester hydraulic fluids for use in the instant claimed invention include the following: Mobil Pyrogard 53, available from ExxonMobil and HF-DR-46, available from ExxonMobil. Suitable polyol ester hydraulic fluids for use in the instant claimed invention include Quaker Quintolubric 822 Series Hydraulic Fluids, available from ExxonMobil.

Tracer First, for use with water based hydraulic fluids and non-water based hydraulic fluids may be selected from the group consisting of:
fluorescein (CAS Registry No. 2321-07-5),
fluorescein, sodium salt (CAS Registry No. 518-47-8), aka Acid Yellow 73, Uranine,
halogenated (chloro-, bromo-, iodo-, and combinations thereof) fluorescein compounds, including, but not limited to:
2',7'-dichlorofluorescein (CAS Registry No. 76-54-0),
4,5,6,7-tetrachlorofluorescein (CAS Registry No. 6262-21-1),
4',5'-dibromofluorescein (CAS Registry No. 596-03-2),
2',4',5',7'-tetrabromofluorescein, disodium salt (CAS Registry No. 17372-87-1), aka Eosin Y,
2',4',5', 7'-tetraiodofluorescein, disodium salt (CAS Registry No. 16423-68-0), aka Erythrosin B,
2',4',5',7'-tetrabromo-4,5,6,7-tetrachlorofluorescein, disodium salt (CAS Registry No. 18472-87-2), aka Phloxine B,
1-ethylquinaldinium iodide (CAS Registry No. 606-55-3),
anthra[9,1,2-cde]benzo[rst]pentaphene-5,10-diol, 16,17-dimethoxy-, bis(hydrogen sulfate), disodium salt, aka Anthrasol Green IBA (CAS Registry No. 2538-84-3), aka Solubilized Vat Dye,
9,9'-biacridinium, 10,10'-dimethyl-, dinitrate, aka Lucigenin (CAS Registry No. 2315-97-1), aka bis-N-methylacridinium nitrate,
5-dimethylamino-1-naphthalenesulfonic acid (CAS Registry No. 4272-77-9),
quinoline (CAS Registry No. 91-22-5),
3H-phenoxazin-3-one, 7-hydroxy-, 10-oxide, (CAS Registry No. 550-82-3), aka Rhodalux,
rhodamine compounds and salts thereof, including but not limited to:
xanthylium, 9-(2,4-dicarboxyphenyl)-3,6-bis(diethylamino)-, chloride, disodium salt, (CAS Registry No. 37299-86-8), aka Rhodamine WT,
phenazinium, 3,7-diamino-2,8-dimethyl-5-phenyl-, chloride (CAS Registry No. 477-73-6), aka Safranine O,
sulforhodamine compounds and salts thereof, including but not limited to:
xanthylium, 3,6-bis(diethylamino)-9-(2,4-disulfophenyl)-, inner salt, sodium salt, aka Sulforhodamine B (CAS Registry No. 3520-42-1, aka Acid Red 52),
sulfonated amino-stilbene fluorescent brighteners and salts thereof, including, but not limited to:
2,2'-stilbenedisulfonic acid, 4,4'-bis[5-[(4-methoxy-6-phenoxy-1,3,5-triazin-2-yl)amino]-, disodium salt (CAS Registry No. 3827-17-6), aka Fluorescent Brightener 234,
benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, aka Tinopal 5BM-GX (CAS Registry No. 169762-28-1),
benzenesulfonic acid, 2,2'-(1,2-ethenediyl)bis[5-[[4-[bis(2-hydroxyethyl)amino]-6-[ (4-sulfophenyl)amino]-1,3,5-triazin-2-yl]amino]-, tetrasodium salt, aka Sandoz CD (CAS Registry No. 16470-24-9, aka Flu. Bright. 220),
benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, aka Sandoz TH-40 (CAS Registry No. 32694-95-4),
sulfonated stilbene naphthotriazole fluorescent brighteners and salts thereof, including, but not limited to:
benzenesulfonic acid, 5-(2H-naphtho[1,2-d]triazol-2-yl)-2-(2-phenylethenyl)-, sodium salt, (CAS Registry No. 6416-68-8), aka Tinopal RBS 200,
2-[4-(dimethylaminostyryl]-1-alkylpyridinium iodide compounds, including, but not limited to:
2-[4-(dimethylamino)styryl]-1-methylpyridinium iodide (CAS Registry No. 2156-29-8),
2-[4-(dimethylamino)styryl]-1-ethylpyridinium iodide (CAS Registry No. 3785-01-1),
2-[p-(dimethylaminostyryl]-1-alkylquinolinium iodide compounds, including, but not limited to:
2-[p-(dimethylaminostyryl]-1-methylquinolinium iodide (CAS Registry No. 3915-61-5),
Mono-, di-, or tri-sulfonated amino-naphthalene acids and salts thereof, including, but not limited to:
7-aminonaphthalene-1,3-disulfonic acid, potassium salt (CAS Registry No. 842-15-9),
4-aminonaphthalene-1-sulfonic acid, sodium salt (CAS Registry No. 130-13-2,)
phenothiazin-5-ium, 3,7-bis(dimethylamino)-, chloride, trihydrate (CAS Registry No. 7220-79-3), aka Methylene Blue,
2-amino-5-methylbenzenesulfonic acid (CAS Registry No. 88-44-8),
amino-benzenesulfonic acids and salts thereof, including, but not limited to:

4-aminobenzenesulfonic acid, sodium salt hydrate (CAS Registry No. 123333-70-0), aka p-sulfanilic acid, sodium salt,
sulfonated bi-stilbene fluorescent brighteners and salts thereof, including, but not limited to:
4',4'-bi[stilbene-2,2'''-disulfonate]disodium salt (CAS Registry No. 27344-41-8), aka Tinopal CBS,
alkylamino-coumarin fluorescent brighteners and salts thereof, including, but not limited to:
4-methyl-7-(diethylamino)-4-methylcoumarin (CAS Registry No. 91-44-1), aka Fluorescent Brightener 52, and
1-deoxy-1-(3,4-dihydro-7,8-dimethyl-2,4-dioxobenzo[g]pteridin-10(2H)-yl)-D-ribitol, (CAS Registry No. 83-88-5), aka Riboflavin or Vitamin B2.

The preferred compounds of Tracer First, for use with water based hydraulic fluids and non-water based hydraulic fluids may be selected from the group consisting of:
fluorescein (CAS Registry No. 2321-07-5),
fluorescein, sodium salt (CAS Registry No. 518-47-8), aka Acid Yellow 73, Uranine,
2-[4-(dimethylamino)styryl]-1-alkylpyridinium iodide compounds, including, but not limited to:
2-[4-(dimethylamino)styryl]-1-methylpyridinium iodide (CAS Registry No. 2156-29-8),
2-[4-(dimethylamino)styryl]-1-ethylpyridinium iodide (CAS Registry No. 3785-01-1),
2-[p-(dimethylaminostyryl]-1-alkylquinolinium iodide compounds, including, but not limited to:
2-[p-(dimethylaminostyryl]-1-methylquinolinium iodide (CAS Registry No. 3915-61-5),
mono-, di-, or tri-sulfonated amino-naphthalene acids and salts thereof, including, but not limited to:
7-aminonaphthalene-1,3-disulfonic acid, potassium salt (CAS Registry No. 842-15-9),
4-aminonaphthalene-1-sulfonic acid, sodium salt (CAS Registry No. 130-13-2),
phenothiazin-5-ium, 3,7-bis(dimethylamino)-, chloride, trihydrate (CAS Registry No. 7220-79-3), aka Methylene Blue,
2-amino-5-methylbenzenesulfonic acid (CAS Registry No. 88-44-8),
amino-benzenesulfonic acids and salts thereof, including, but not limited to:
4-aminobenzenesulfonic acid, sodium salt hydrate (CAS Registry No. 123333-70-0), aka p-sulfanilic acid,
sulfonated stilbene naphthotriazole fluorescent brighteners and salts thereof, including, but not limited to:
benzenesulfonic acid, 5-(2H-naphtho[1,2-d]triazol-2-yl)-2-(2-phenylethenyl)-, sodium salt, (CAS Registry No. 6416-68-8), aka Tinopal RBS 200,
sulfonated amino-stilbene fluorescent brighteners and salts thereof, including, but not limited to:
2,2'-stilbenedisulfonic acid, 4,4'-bis[5-[(4-methoxy-6-phenoxy-1,3,5-triazin-2-yl)amino]-, disodium salt (CAS Registry No. 3827-17-6), aka Fluorescent Brightener 234,
benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, (CAS Registry No. 169762-28-1), aka Tinopal 5BM-GX,
benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, aka Sandoz CD (CAS Registry No. 16470-24-9, aka Flu. Bright. 220),
benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, aka Sandoz TH-40 (CAS Registry No. 32694-95-4),
sulfonated bi-stilbene fluorescent brighteners and salts thereof, including, but not limited to:
4',4'-bi[stilbene-2,2'''-disulfonate]disodium salt (CAS Registry No. 27344-41-8), aka Tinopal CBS,
alkylamino-coumarin fluorescent brighteners and salts thereof, including, but not limited to:
4-methyl-7-(diethylamino)-4-methylcoumarin (CAS Registry No. 91-44-1), aka Fluorescent Brightener 52,
rhodamine compounds, including, but not limited to:
xanthylium, 9-(2,4-dicarboxyphenyl)-3,6-bis(diethylamino)-, chloride, disodium salt, aka Rhodamine WT (CAS Registry No. 37299-86-8),
and
sulforhodamine dye compounds, including, but not limited to:
xanthylium, 3,6-bis(diethylamino)-9-(2,4-disulfophenyl)-, inner salt, sodium salt, aka Sulforhodamine B (CAS Registry No. 3520-42-1), aka Acid Red 52.

The most preferred compounds of Tracer First for use with water based hydraulic fluids and non-water based hydraulic fluids are selected from the group consisting of
fluorescein (CAS Registry No. 2321-07-5),
fluorescein, sodium salt (CAS Registry No. 518-47-8), aka Acid Yellow 73, Uranine,
sulfonated amino-stilbene fluorescent brighteners and salts thereof, including, but not limited to:
benzenesulfonic acid, 2,2'-(1,2-ethenediyl)bis[5-[[4-[bis(2-hydroxyethyl)amino]-6-[ (4-sulfophenyl)amino]-1,3,5-triazin-2-yl]amino]-, tetrasodium salt, aka Sandoz CD (CAS Registry No. 16470-24-9), aka Flu. Bright. 220,
benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, (CAS Registry No. 32694-95-4), aka Sandoz TH-40,
benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, (CAS Registry No. 169762-28-1), aka Tinopal 5BM-GX, and
benzenesulfonic acid, 5-(2H-naphtho[1,2-d]triazol-2-yl)-2-(2-phenylethenyl)-, sodium salt, (CAS Registry No. 6416-68-8), aka Tinopal RBS 200.

All Tracer First materials are commercially available from chemical supply houses or capable of being synthesized using techniques known in the art of synthetic organic chemistry.

All Tracer First materials are believed to be stable towards pH changes in the hydraulic fluid in production plant applications where they are used. All Tracer First Materials are capable of having their fluorescent signal degraded upon contact with various materials that may be found in cooling water, such as oxidizing biocides and cationic coagulants. Tracer First materials may encounter oxidizing biocides and cationic coagulants in the event the traced hydraulic fluid leaks into a cooling water system.

All Tracer First materials are detectable using a suitable fluorometer at a lower limit of at least about 50 ppt, preferably at least about 5 ppb, and most preferably at least about 500 ppb.

Tracer Second, for use with water based hydraulic fluids and non-water based hydraulic fluids may be selected from the group consisting of:
monosulfonated anthracenes and salts thereof, including, but not limited to:
2-anthracenesulfonic acid sodium salt (CAS Registry No. 16106-40-4), disulfonated anthracenes and salts thereof, see U.S. patent application Ser. No. 10/631,606, filed Jul. 31, 2003, entitled "Use of Disulfonated Anthracenes as Inert Fluorescent Tracers", now pending, which is incorporated by reference in its entirety,
including, but not limited to:
1,5-anthracenedisulfonic acid (CAS Registry No. 61736-91-2),
2,6-anthracenedisulfonic acid (CAS Registry No. 61736-95-6),
1,8-anthracenedisulfonic acid (CAS Registry No. 61736-92-3),
4-dibenzofuransulfonic acid (CAS Registry No. 42137-76-8),
3-dibenzofuransulfonic acid (CAS Registry No. 215189-98-3),
1,5-naphthalenedisulfonic acid, disodium salt (hydrate) (CAS Registry No. 1655-29-4), aka 1,5-NDSA hydrate,
sulfonated stilbene-triazole fluorescent brighteners and salts thereof, including, but not limited to:
benzenesulfonic acid, 2,2'-(1,2-ethenediyl)bis[5-(4-phenyl-2H-1,2,3-triazol-2-yl)-, dipotassium salt, (CAS Registry No. 52237-03-3), aka Phorwite BHC 766,
2,2'-stilbenedisulfonic acid, 4,4'-bis(4-phenyl-2H-1,2,3-triazol-2-yl)-, disodium salt, (CAS Registry No. 23743-28-4), aka Phorwite BHC, and
1,3,6,8-pyrenetetrasulfonic acid, tetrasodium salt (CAS Registry No. 59572-10-0).

The preferred compounds of Tracer Second, for use with water-based hydraulic fluids and non-water based hydraulic fluids are selected from the group consisting of:
monosulfonated anthracenes and salts thereof, including, but not limited to:
2-anthracenesulfonic acid sodium salt (CAS Registry No. 16106-40-4),
disulfonated anthracenes and salts thereof, including, but not limited to:
1,5-anthracenedisulfonic acid (CAS Registry No. 61736-91-2),
2,6-anthracenedisulfonic acid (CAS Registry No. 61736-95-6),
1,8-anthracenedisulfonic acid (CAS Registry No. 61736-92-3),
1,5-naphthalenedisulfonic acid, disodium salt (hydrate) (CAS Registry No. 1655-29-4), aka 1,5-NDSA hydrate,
4-dibenzofuransulfonic acid (CAS Registry No. 42137-76-8),
3-dibenzofuransulfonic acid (CAS Registry No. 215189-98-3),
sulfonated stilbene-triazole fluorescent brighteners and salts thereof, including, but not limited to:
benzenesulfonic acid, 2,2'-(1,2-ethenediyl)bis[5-(4-phenyl-2H-1,2,3-triazol-2-yl)-, dipotassium salt, aka Phorwite BHC 766 (CAS Registry No. 52237-03-3), and
2,2'-stilbenedisulfonic acid, 4,4'-bis(4-phenyl-2H-1,2,3-triazol-2-yl)-, disodium salt, aka Phorwite BHC (CAS Registry No. 23743-28-4).

The most preferred Tracer Second materials for use with water based hydraulic fluids are selected from the group consisting of:
monosulfonated anthracenes and salts thereof, including, but not limited to:
2-anthracenesulfonic acid sodium salt (CAS Registry No. 16106-40-4),
Disulfonated anthracenes and salts thereof, including, but not limited to:
1,5-anthracenedisulfonic acid (CAS Registry No. 61736-91-2),
2,6-anthracenedisulfonic acid (CAS Registry No. 61736-95-6),
1,8-anthracenedisulfonic acid (CAS Registry No. 61736-92-3), and
1,5-naphthalenedisulfonic acid, disodium salt (hydrate) (CAS Registry No. 1655-29-4, aka 1,5-NDSA hydrate).

All Tracer Second materials are commercially available from chemical supply houses or capable of being synthesized using techniques known in the art of synthetic organic chemistry.

All Tracer Second materials are detectable using a suitable fluorometer at a lower limit of at least about 1 ppb, preferably at least about 100 ppb, and most preferably at least about 10 ppm.

The amount of Tracer First present in a water-based hydraulic fluid or a non-water based hydraulic fluid is from about 0.01 ppm to about 10,000 ppm, preferably from about 0.05 ppm to about 10 ppm and most preferably from about 0.1 ppm to about 1.0 ppm.

The amount of Tracer Second present in a water-based hydraulic fluid or a non-water based hydraulic fluid is from about 0.01 ppm to about 10,000 ppm, preferably from about 0.05 ppm to about 10 ppm and most preferably from about 0.1 ppm to about 1.0 ppm.

The amount of Tracer Second present in a non-water-based hydraulic fluid is from about 0.01 ppm to about 10,000 ppm, preferably from about 0.05 ppm to about 10 ppm and most preferably from about 0.1 ppm to about 1.0 ppm.

The amount of Tracer First and Tracer Second added to the hydraulic fluid is known and the relative proportion of each Tracer to each other and to the hydraulic fluid is also known. This means that when the fluorescent signal of the tracer is detected and the amount of the tracer is calculated, it is known in the art of fluorometry how to convert a detected fluorescent signal for a material to the amount of material present, it is possible to calculate the amount of hydraulic fluid present. Knowing the amount of hydraulic fluid present means that it is possible to determine the leakage rate of the hydraulic fluid into the water of the cooling water system.

Suitable fluorometers for use to detect Tracer First are commercially available and are selected from the group consisting of TRASAR 8000 fluorometer ("hand-held"); TRASAR 700 fluorometer ("Bench-top"); TRASAR 3000 (for 1,3,6,8-pyrenetetrasulfonic acid, tetrasodium salt or any tracer with excitation and emission wavelengths similar to 1,3,6,8-pyrenetetrasulfonic acid, tetrasodium salt); modified TRASAR 3000 (for anthracene disulfonic acid disodium salt tracer or any tracer with excitation wavelength greater than 370 nm); TRASAR Xe-2 Controller; which are all available from Nalco and the In-Line fluorometer probe, known as the Cyclops 7 fluorometer (optical filters would need to be chosen to match the Tracer) available from Turner Designs, 845 W. Maude Ave., Sunnyvale, Calif. 94085 ((408)749-0994). The preferred fluorometer is the TRASAR Xe-2 Controller. In order to make use of these fluorometers the excitation and emission optical filters will need to be chosen to match up with the fluorescent signal properties of the Tracer.

Suitable fluorometers for use to detect Tracer Second are commercially available and are selected from the group consisting of TRASAR 8000 fluorometer ("hand-held"); TRASAR 700 fluorometer ("Bench-top"); TRASAR 3000 (for naphthalene disulfonic acid); modified TRASAR 3000 (for anthracene disulfonic acid disodium salt tracer);

TRASAR Xe-2 Controller; which are all available from Nalco; and the In-Line fluorometer probe, known as the Cyclops 7 fluorometer (optical filters would need to be chosen to match the Tracer used) available from Turner Designs, 845 Maude Ave., Sunnyvale, Calif. 94085 ((408) 749-0994). The preferred fluorometer is the TRASAR Xe-2 Controller. In order to make use of these fluorometers the excitation and emission optical filters will need to be chosen to match up with the fluorescent signal properties of the Tracer.

The Trasar Xe-Controller, Trasar 3000 fluorometers have flow cells that permit on-line continuous monitoring of a liquid. The Trasar 700 and Trasar 8000 fluorometers do not have flow cells, rather they measure one discrete sample at a time wherein the samples are provided in discrete quantities obtained using a "grab sample" technique. When selecting the fluorometer the decision to select a fluorometer with a flow cell permitting continuous monitoring of a liquid versus a fluorometer that requires a discrete sample be put into it for testing, is based on the circumstances of the test. For example, the monitoring of Tracer First would suggest a flow cell fluorometer be the first choice as the detection of Tracer First in the water is used for the rapid determination of whether hydraulic fluid is leaking. However, the monitoring of Tracer Second, which is done to show the overall amount of hydraulic fluid in the water of the cooling water system, can be done either with a flow cell fluorometer or with a grab sample fluorometer, depending upon how often it is decided to measure the overall amount of hydraulic fluid in the water of the cooling water system.

One or more fluorometers are placed throughout the cooling water system of the production plant in the desired location and set up to detect either Tracer First or Tracer Second.

The preferred location for the fluorometer capable of detecting Tracer First is a location just after the cooling water has come into contact with the product being produced and is draining off the product. The more preferred location is at the first access point to cooling water after the last location where hydraulic fluid could leak into the cooling water system after the cooling water had come into contact with the product being contacted with the cooling water.

The preferred location for the fluorometer capable of detecting Tracer Second is anywhere in the cooling water system downstream of the suspected leakage point where good mixing of the water and leaked hydraulic fluid has occurred. The more preferred location is in the cooling water system close to the location where blowdown takes place from the cooling water system. The most preferred location for a fluorometer capable of detecting the fluorescent signal of Tracer Second is locating the fluorometer in the blowdown pipe or in the continuous blowdown line for the cooling water system.

The basis for the value of the instant claimed method is that the dual tracer-containing hydraulic fluids contain one tracer, Tracer First, which is easy to detect rapidly after it appears in the water of the cooling water system, in the event that there is leakage of the hydraulic fluid into the water of the cooling water system. Tracer First may be detected at a very low level of about 50 ppt. However, the Tracer First material is capable of having its fluorescent signal degraded over time by contact with certain materials such as oxidizing biocides or cationic coagulants. Because the signal is capable of being degraded by materials present in the cooling water there is no opportunity for Tracer First to in the cooling water system. Thus, Tracer First is the "quickly-detectable, short-term tracer" of the dual tracer pair. Knowledge of the level of Tracer First in the process cooling water and the flow rate of the water stream from which it is being sampled allows the hydraulic fluid leakage rate to be calculated. Alarms may be set on the fluorometers for detecting Tracer First depending on the level of Tracer First detected and the corresponding hydraulic fluid leakage rate.

The dual tracer-containing hydraulic fluids also contains a second tracer, Tracer Second, which has a fluorescent signal that is not capable of being degraded over time by contact with certain materials when Tracer Second appears in the water of the cooling water system, in the event that there is leakage of the hydraulic fluid into the water of the cooling water system. Therefore, in the event of continuing leakage of hydraulic fluid into the water of the cooling water system, the Tracer Second material will build up in the cooling water system at a rate equivalent to the increase in dosage of hydraulic fluid which has leaked into the cooling water system. With a steady leak, this build-up will continue until such point in time that blowdown takes place. Tracer Second thus is the "long-acting tracer" of the dual tracer pair which indicates the cumulative level of hydraulic fluid leakage into the process cooling water system over time.

After the fluorescent signals of Tracer First and Tracer Second have been detected, a person of ordinary skill in the art of fluorometry can correlate the detected fluorescent signals with the amount of Tracer First and Tracer Second present. By knowing the amount of Tracer First and Tracer Second present, the operator of the production plant will be able to ascertain whether any leakage is occurring and the current level of hydraulic fluid contamination in the cooling system. This is very useful information to have.

By being able to rapidly detect the first appearance of hydraulic fluid in the cooling water, by detecting the presence of Tracer First, and by also being able to rapidly determine the overall amount of hydraulic fluid in the water of the water of the cooling water system, by detecting the presence of Tracer Second, it is possible to adjust the operating conditions of the production plant quickly in order to fix leaks or in the alternative to compensate for leaks by increasing blowdown. The rapid detection of leaks means it is possible to determine that there is a leak and to correct for the leak before there is any visual evidence of the leaks. This means it is possible to operate the production plant at the best possible level of production known to people of ordinary skill in the art of operating production plants.

The following examples are presented to be illustrative of the present invention and to teach one of ordinary skill how to make and use the invention. These examples are not intended to limit the invention or its protection in any way.

EXAMPLES

Example 1

Detection and Correction of Hydraulic Fluid Leak

This example describes the impact of a hydraulic fluid leak in an aluminum metal casting system.

A water-glycol hydraulic fluid that is being used in a large aluminum production plant has 201 ppm of fluorescein sodium salt, Tracer First, and 500 ppm of 1,5-naphthalene disulfonic acid, disodium salt, Tracer Second, added to it.

The cooling water flowrate across the hot aluminum metal surface in the casting system is 10,000 gallons per minute.

A TRASAR Xe-2 Controller is configured to have the appropriate excitation and emission filters to detect the fluorescent signal of fluorescein, Tracer First. This fluorometer is located directly downstream of the hot aluminum metal casting system on the cooling water return line in order to detect and measure the fluorescent signal of any fluorescein that is present in the cooling water due to leakage of the hydraulic fluid into the water.

The combined time of travel for the water, and any leaking hydraulic fluid, and response time of the fluorometer in detecting and measuring the fluorescent signal of the fluorescein is 5–10 seconds.

A second TRASAR Xe-2 Controller is configured to have the appropriate excitation and emission filters to detect the fluorescent signal of 1,5-naphthalene disulfonic acid, disodium salt, Tracer Second, in the recirculating cooling water. The second TRASAR Xe-2 Controller is installed near the blowdown valve of the system.

The cooling water system volume is 100,000 gallons; the blowdown rate of cooling water is 25 gallons/minute and the holding time index is 46 hours.

During this test, both TRASAR Xe-2 controllers are operated in monitoring mode. As a comparison, detection of hydraulic fluid leaks is also undertaken by visual inspection of the production equipment and water in the cooling water system. The standard for this test is that corrective actions are to be taken after a problem is visually identified, such as by the presence of foam in the cooling tower, or performance problems occuring in the cooling water system.

Some 11 and ½ hours after the test begins, a very small leak of traced hydraulic fluid, begins. The leak rate is calculated to be 0.1 gpm, based on the detected and measured fluorescent signal of the fluorescein, Tracer First. As is customary in the art of fluorescent tracer technology, the reading given from the fluorometer is in concentration of tracer material, 0.2 ppm of fluorescein, rather than in raw fluorescent signal date. This is because the fluorometer can be and is programmed to automatically convert the detected and measured fluorescent signal into the concentration of the material being detected, using charts that indicate the proper relationship between fluorescent signal and concentration.

The fluorometer for detecting Tracer First sends an ALARM signal to plant operators to indicate that a leak is occurring and displays the calculated leak rate to plant personnel. Over a period of 3 days, the detected and measured amount of 1,5-naphthalene disulfonic acid, disodium salt, Tracer Second in the cooling water system increases to above 0.2 ppm, indicating more than 400 ppm of hydraulic fluid in the cooling water system. As a comparison it is noted that the hydraulic fluid leakage is too small to be easily detected visually.

After 3 days of operating the plant with the continuous, albeit small leak of hydraulic fluid continuing, problems are visibly observed in the cooling water system. These problems include foaming, increased demand for oxidizing biocide and increased microbiological activity. When these problems are noted, a more detailed visual inspection check of the hydraulic fluid system locates the point where the hydraulic fluid is leaking. The leak is then fixed.

It is decided that the hydraulic fluid that had already leaked into the cooling water system is to be allowed to be gradually removed over time through blowdown of water containing the leaked hydraulic fluid from the cooling water system and replacement with fresh makeup water. The total amount of hydraulic fluid that leaks is determined to be about 432 gallons.

Example 2

Detection of and Automatic Compensation for Hydraulic Fluid Leak

The test conditions present for Example 1 are identical in this example except that the TRASAR Xe-2 Controller set up to detect the fluorescent signal of 1,5-naphthalene disulfonic acid, disodium salt, Tracer Second, is also configured to provide an output signal to the blowdown valve on the cooling water system which acts as a control signal to the blowdown valve to double the average blowdown rate (from 25 gpm to 50 gpm) whenever the fluorometer detects and measures an amount of Tracer Second greater than 0.01 ppm, corresponding to greater than 20 ppm of hydraulic fluid contamination in the cooling water system.

This experimental design is selected to reduce the steady-state concentration of hydraulic fluid in the water of the cooling water system by 50% in the event of a continuing leak of hydraulic fluid.

During this test, as is done in Example 1, detection of hydraulic fluid leaks is done by visual inspection and corrective actions taken after a problem is found or performance problems occur in the cooling water system.

In this example, about 7¾ hours into the test, a very small amount, 0.1 gpm of Tracer First is detected in the cooling water. As is the case in Example 1, detected fluorescent signal of the fluorescein increases within 5–10 seconds after leakage starts. The Trasar Xe-2 Controller for detecting Tracer First sends an ALARM signal to plant operators to indicate that a leak is occurring and displays the calculated leak rate to plant personnel.

Once the leak starts, the level of Tracer Second in the system increases steadily. It takes about 2 hours for the level of Tracer Second to be above the 20 ppm threshold for increasing the blowdown rate. As described previously, in contrast to Example 1, when the dosage of Tracer Second reaches 20 ppm in the cooling water system, additional blowdown is activated in order to double the average blowdown rate. The blowdown increases from 25 gpm to 50 gpm.

Over a period of 36 hours, the level of hydraulic fluid in the cooling water, as indicated by the detected and measured fluorescent signal of Tracer Second, rapidly increases before leveling off as steady state is approached, due to the automatic activation of blowdown. It is determined that the steady-state hydraulic fluid contamination is this system will be 50% lower than that where no corrective action is taken. This allows the plant to operate in a less "stressed" condition until the necessary equipment can be shut down to fix the leak.

The conclusion is that achieving a lower average dosage of hydraulic fluid in the water of a cooling water system helps to prevent performance problems in both the cooling water and metal casting systems.

Example 3

Rapid Response to Hydraulic Fluid Leak

The cooling water operating characteristics and overall operating conditions are the same as in Example 2. In addition, the plant operators have knowledge that in the event of a hydraulic fluid leak into the cooling water system of greater than 0.2 gpm, the caster is to be shut down immediately for repairs.

A hydraulic fluid leak of 0.25 gpm occurs. The Trasar Xe-2 Controller for detecting Tracer First sends an ALARM signal to plant operators to indicate that a leak is occurring and displays the calculated leak rate to plant personnel. The caster is shut down and the hydraulic fluid leak is located and repaired by plant personnel as soon as practical.

As is the case in Example 2, when the concentration of traced hydraulic fluid reaches 20 ppm in the cooling water system, as determined by the presence of Tracer Second, additional blowdown is activated in order to double the average blowdown rate from 25 gpm to 50 gpm.

After the leak is fixed, the fluorometer detecting Tracer Second maintains the elevated blowdown rate until the system is sufficiently purged of hydraulic fluid such that the concentration of hydraulic fluid in the cooling water drops below 20 ppm. At this point, the blowdown rate is returned to its original 25 gpm.

The lower average dosage of hydraulic fluid in the cooling water in Example 3 helps to further prevent performance problems in both the cooling water and metal casting systems. The amount of hydraulic fluid that leaks is also much lower, in comparison with the amount of hydraulic fluid that leaks in Examples 1 and 2.

These Examples illustrate the instant claimed invention. The Examples clearly show that the ability of the fluorometers and Tracer First and Tracer Second to characterize the magnitude of the hydraulic leakage rate and dosage, along with automatic compensation for hydraulic fluid leaks allows the production plant to be operated at the best possible level.

What is claimed is:

1. A method of detecting and compensating for leakage of hydraulic fluids in a production plant, comprising the steps of:
   1) providing a production plant wherein at least one hydraulic fluid is in use to operate equipment, wherein the equipment operated shapes the product being produced into a desired form, wherein said product being produced is contacted, in at least one point in the production process, with water, wherein the water that contacts the product is then collected and circulated through the production plant cooling water system;
   2) adding to said hydraulic fluid, two tracer materials,
      (a) wherein the first tracer material, known as Tracer First, is capable of being detected at a level of at least about 50 ppt and is capable of having its fluorescent signal degraded by contact with materials present in the cooling water, and wherein the second tracer material, known as Tracer Second, is capable of being detected at a level of at least about 1 ppb, and is not capable of having its fluorescent signal degraded by contact with materials present in the cooling water,
      (b) wherein each of Tracer First and Tracer Second is added to said hydraulic fluid in a known proportion to said hydraulic fluid and to each other, and
      (c) wherein the fluorescent signals of each of Tracer First and Tracer Second are individually detectable in said hydraulic fluid, and the fluorescent signals of each of Tracer First and Tracer Second are individually detectable in said water that is collected and circulated through the production plant cooling water system;
   3) providing one or more fluorometers capable of detecting the fluorescent signal of Tracer First and locating said one or more fluorometers in any location within the cooling water system of said production plant, where it is desired to detect and compensate for leakage of hydraulic fluid;
   4) providing one or more fluorometers capable of detecting the fluorescent signal of Tracer Second and locating said one or more fluorometers in any location within the cooling water system of said production plant where it is desired to detect and compensate for leakage of hydraulic fluid;
   5) using a fluorometer to detect and measure the fluorescent signal of said Tracer First in each location chosen;
   6) using a fluorometer to detect and measure the fluorescent signal of said Tracer Second in each location chosen;
   7) using the detected and measured fluorescent signals of Tracer First and of Tracer Second to determine how much of the hydraulic fluid is present in the cooling water system of said production plant; and optionally;
   8) adjusting the operating parameters of said production plant, such that the amount of hydraulic fluid present in said cooling water system is minimized or compensated for such that operation of the production plant is maintained at the best possible level.

2. The method of claim 1 wherein the production plant is an aluminum mill.

3. The method of claim 1 wherein the production plant is a steel mill.

4. The method of claim 1 wherein Tracer First is selected from the group consisting of:
fluorescein,
fluorescein, sodium salt,
2',7'-dichlorofluorescein,
4,5,6,7-tetrachlorofluorescein,
4',5'-dibromofluorescein,
2',4',5',7'-tetrabromofluorescein, disodium salt,
2',4',5'7'-tetraiodofluorescein, disodium salt,
2',4',5',7'-tetrabromo-4,5,6,7-tetrachlorofluorescein, disodium salt
1-ethylquinaldinium iodide,
anthra[9,1,2-cde]benzo[rst]pentaphene-5,10-diol, 16,17-dimethoxy-, bis(hydrogen sulfate), disodium salt,
9,9'-biacridinium, 10,10'-dimethyl-, dinitrate,
5-dimethylamino-1-naphthalenesulfonic acid,
quinoline,
3H-phenoxazin-3-one, 7-hydroxy-, 10-oxide,
xanthylium, 9-(2,4-dicarboxyphenyl)-3,6-bis(diethylamino)-, chloride, disodium salt,
phenazinium, 3,7-diamino-2,8-dimethyl-5-phenyl-, chloride
xanthylium, 3,6-bis(diethylamino)-9-(2,4-disulfophenyl)-, inner salt, sodium salt,
2,2'-stilbenedisulfonic acid, 4,4'-bis[5-[(4-methoxy-6-phenoxy-1,3,5-triazin-2-yl)amino]-, disodium salt,
benzenesulfonic acid, 2,2'-(1,2-ethenediyl)bis[5-[[4-[(aminomethyl)(2-hydroxyethyl)amino] -6-(phenylamino)-1,3,5-triazin-2-yl]amino]-, disodium salt,
benzenesulfonic acid, 2,2'-(1,2-ethenediyl)bis[5-[[4-[bis(2-hydroxyethyl)amino]-6-[ (4-sulfophenyl)amino]-1,3,5-triazin-2-yl]amino]-, tetrasodium salt,
benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt,
benzenesulfonic acid, 5-(2H-naphtho[1,2-d]triazol-2-yl)-2-(2-phenylethenyl)-, sodium salt,
2-[4-(dimethylamino)styryl]-1-methylpyridinium iodide,
2-[4-(dimethylamino)styryl]-1-ethylpyridinium iodide,
2-[p-(dimethylaminostyryl]-1-methylquinolinium iodide, 7-aminonaphthalene-1,3-disulfonic acid, potassium salt,
4-aminonaphthalene-1-sulfonic acid, sodium salt,
phenothiazin-5-ium, 3,7-bis(dimethylamino)-, chloride, trihydrate,
2-amino-5-methylbenzenesulfonic acid,
4-aminobenzenesulfonic acid, sodium salt hydrate,
4',4'-bi[stilbene-[2,2'''-disulfonate]disodium salt,
4-methyl-7-(diethylamino)-4-methylcoumarin, and
1-deoxy-1-(3,4-dihydro-7,8-dimethyl-2,4-dioxobenzo[g]pteridin-10(2H)-yl)-D-ribitol.

5. The method of claim 1 in which Tracer Second is selected from the group consisting of:
2-anthracenesulfonic acid sodium salt,
1,5-anthracenedisulfonic acid,
2,6-anthracenedisulfonic acid,
1,8-anthracenedisulfonic acid,
4-dibenzofuransulfonic acid,
3-dibenzofuransulfonic acid,
1,5-naphthalenedisulfonic acid, disodium salt (hydrate),
benzenesulfonic acid, 2,2'-(1,2-ethenediyl)bis[5-(4-phenyl-2H-1,2,3-triazol-2-yl)-, dipotassium salt, and
2,2'-stilbenedisulfonic acid, 4,4'-bis(4-phenyl-2H-1,2,3-triazol-2-yl)-, disodium salt.

6. The method of claim 1 wherein said hydraulic fluid is a water based hydraulic fluid selected from the group consisting of:
 a) water/glycol hydraulic fluids;
 b) water-in-oil emulsion hydraulic fluids; and
 c) oil-in-water emulsion hydraulic fluids.

7. The method of claim 6 wherein said hydraulic fluid is a water/glycol hydraulic fluid.

8. The method of claim 6 wherein said hydraulic fluid is a water-in-oil emulsion hydraulic fluid.

9. The method of claim 6 wherein said hydraulic fluid is an oil-in-water emulsion hydraulic fluid.

10. The method of claim 1 wherein said hydraulic fluid is a non-water based hydraulic fluid selected from the group consisting of phosphate ester based hydraulic fluids and polyol ester hydraulic fluids.

11. The method of claim 10 wherein said non-water based hydraulic fluid is a phosphate ester based hydraulic fluid.

12. The method of claim 11 wherein said non-water based hydraulic fluid is a polyol ester hydraulic fluid.

13. The method of claim 1 wherein Tracer First is selected from the group consisting of:
fluorescein and fluorescein, sodium salt and wherein Tracer Second is selected
from the group consisting of
2-anthracenesulfonic acid sodium salt,
1,5-anthracenedisulfonic acid,
2,6-anthracenedisulfonic acid,
1,8-anthracenedisulfonic acid, and
1,5-naphthalenedisulfonic acid, disodium salt.

14. The method of claim 13 wherein Tracer First is fluorescein, sodium salt and Tracer Second is 1,5-naphthalenedisulfonic acid, disodium salt.

15. The method of claim 13 wherein the hydraulic fluid is a water based hydraulic fluid.

16. The method of claim 13 wherein the hydraulic fluid is a non-water based hydraulic fluid.

17. The method of claim 13 wherein said production plant is an aluminum mill.

18. The method of claim 13 wherein said production plant is a steel mill.

* * * * *